US012386132B2

(12) United States Patent
Spreemann

(10) Patent No.: US 12,386,132 B2
(45) Date of Patent: Aug. 12, 2025

(54) INTERMITTENTLY BONDED FIBER OPTIC RIBBON

(71) Applicant: CORNING RESEARCH & DEVELOPMENT CORPORATION, Corning, NY (US)

(72) Inventor: Martin Spreemann, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 217 days.

(21) Appl. No.: 18/103,613

(22) Filed: Jan. 31, 2023

(65) Prior Publication Data

US 2023/0176311 A1 Jun. 8, 2023

Related U.S. Application Data

(63) Continuation of application No. PCT/US2021/045173, filed on Aug. 9, 2021.

(60) Provisional application No. 63/066,390, filed on Aug. 17, 2020.

(51) Int. Cl.
G02B 6/44 (2006.01)
(52) U.S. Cl.
CPC ........... *G02B 6/448* (2013.01); *G02B 6/4403* (2013.01)
(58) Field of Classification Search
CPC .............................. G02B 6/448; G02B 6/4403
USPC ....................................................... 385/114
See application file for complete search history.

(56) References Cited

U.S. PATENT DOCUMENTS

| 3,125,812 | A | 3/1964 | Simpson |
| 5,018,007 | A | 5/1991 | Ang et al. |
| 6,621,973 | B1* | 9/2003 | Hoffman ............... G02B 6/0096 385/125 |
| 2004/0175521 | A1* | 9/2004 | Nakamura .......... B29C 35/0888 428/35.2 |
| 2005/0276543 | A1* | 12/2005 | Bianchi ................ G02B 6/3807 385/136 |
| 2015/0131098 | A1* | 5/2015 | Yang .................. A61B 5/14535 356/402 |
| 2016/0356976 | A1 | 12/2016 | Sajima et al. |

(Continued)

FOREIGN PATENT DOCUMENTS

| EP | 3428703 A1 | 1/2019 |
| JP | 63-013008 A | 1/1988 |

(Continued)

OTHER PUBLICATIONS

International Search Report and Written Opinion of the International Searching Authority; PCT/US21/45173; dated Nov. 4, 2021; 15 pages; International Search Authority.

(Continued)

*Primary Examiner* — Jerry M Blevins
(74) *Attorney, Agent, or Firm* — William D. Doyle

(57) ABSTRACT

A method of fabricating an optical fiber ribbon is provided, the method including arranging a plurality of optical fibers adjacent to each other along a length of the optical fiber ribbon, applying an adhesive to the plurality of optical fibers, intermittently exposing the adhesive to a curing catalyst in at least one interstice between two adjacent optical fibers of the plurality of optical fibers to create bonding regions along the length of the optical fiber ribbon, and removing uncured adhesive from the plurality of optical fibers.

20 Claims, 4 Drawing Sheets

(56) References Cited

U.S. PATENT DOCUMENTS

| | | | |
|---|---|---|---|
| 2017/0031121 A1 | 2/2017 | Blazer et al. | |
| 2017/0219792 A1 | 8/2017 | Debban et al. | |
| 2019/0369343 A1* | 12/2019 | Chalk | G02B 6/4411 |
| 2021/0191061 A1 | 6/2021 | Isaji et al. | |

FOREIGN PATENT DOCUMENTS

| | | |
|---|---|---|
| JP | 2005-114830 A | 4/2005 |
| JP | 2010-002743 A | 1/2010 |
| JP | 2014-010439 A | 1/2014 |
| WO | 2018/102135 A1 | 6/2018 |
| WO | 2019/011417 A1 | 1/2019 |
| WO | 2019/193790 A1 | 10/2019 |
| WO | 2020/161971 A1 | 8/2020 |

OTHER PUBLICATIONS

European Patent Application No. 21858818.4 Extended European Search Report dated Jun. 21, 2024; 8 Pages; European Patent Office.

\* cited by examiner

INTERMITTENTLY BONDED FIBER OPTIC RIBBON

PRIORITY APPLICATION

This application is a continuation application of International Application No. PCT/US2021/045173 filed on Aug. 9, 2021, which claims the benefit of priority to U.S. Provisional Application Ser. No. 63/066,390 filed on Aug. 17, 2020, the content of each of which is relied upon and incorporated herein by reference in their entirety.

FIELD

The disclosure relates generally to optical fibers, and specifically to optical fiber ribbons in which the optical fibers are intermittently bonded together along the length of the optical fiber ribbon.

BACKGROUND

A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections. Further, the optical fiber cable may contain optical fibers arranged in ribbons to allow for multiple optical fibers to be fusion spliced together in a single operation.

SUMMARY

Embodiments of the disclosure relate to methods of fabricating an optical fiber ribbon. The method may include arranging a plurality of optical fibers adjacent to each other along the length of the optical fiber ribbon and applying an adhesive to the optical fibers. The optical fibers may then be intermittently exposed to a curing catalyst in one or more interstice between adjacent optical fibers to create bonding regions along the length of the optical fiber ribbon. The uncured adhesive may then be removed from the optical fibers.

In an example embodiment the curing catalyst may be a light source, such as an ultraviolet (UV) light source, and the adhesive may be a photo curable adhesive, such as a UV curable adhesive. The intermittent exposure of the plurality of optical fibers to the light source may be accomplished by intermittently energizing and deenergizing the light source or by positioning a shutter between the light source and the optical fibers. Additionally, a mask may be provided between the light source and the optical fibers to define the areas exposed to the curing catalyst, which form the bonding regions.

In some example embodiments, the uncured adhesive may be removed by application of a high pressure air source, e.g. air nozzles, sometimes referred to as "pneumatic air cleaners," "air gun," or "air knives". The uncured adhesive may be collected and reused.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

DETAILED DESCRIPTION

Figure 1:
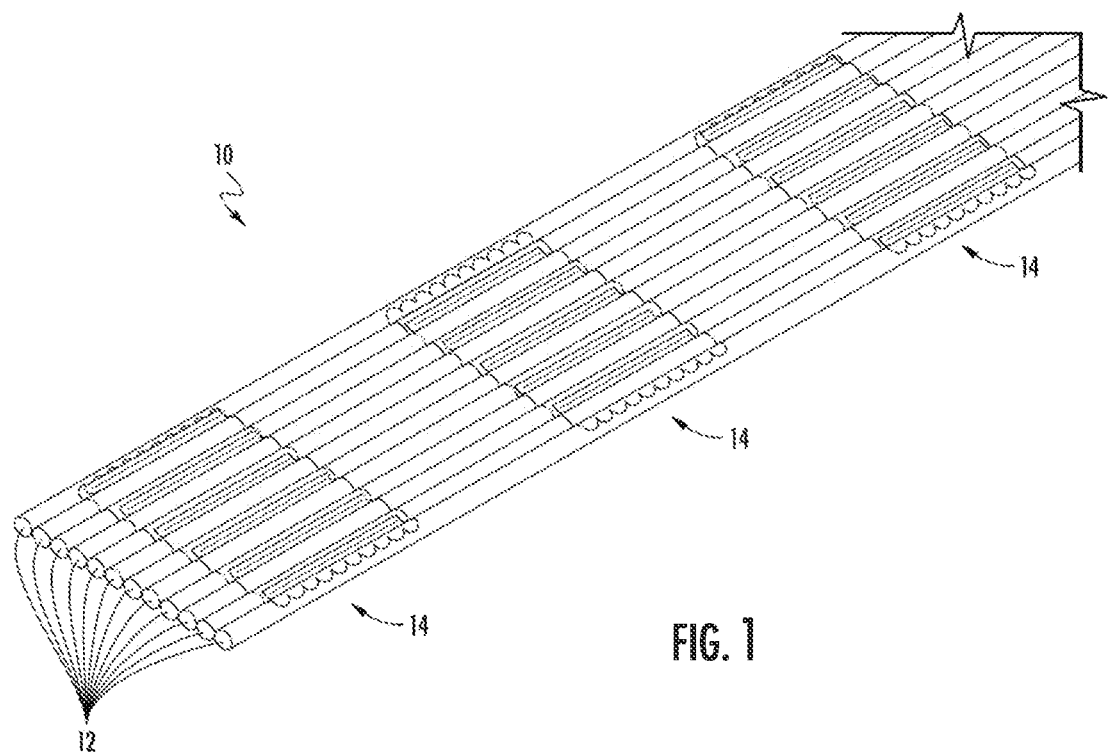
FIG. 1 is partial, perspective view of an intermittently bonded optical fiber ribbon, according to an exemplary embodiment.

Referring generally to the figures, various embodiments of an optical fiber ribbon having intermittent bonding regions as well as methods for producing such an optical fiber ribbon are provided. As described herein, the optical fiber ribbons according to the present disclosure are flexible such that the ribbons can be rolled, curled, or folded from the planar configuration conventionally associated with optical fiber ribbons to a more space-saving configuration. In this way, the ribbons may be carried in cables having smaller diameters, and/or the cables may have a higher fill ratio (i.e., fraction of cross-sectional area filled with optical fibers). In one example of typical intermittent bonding of optical fiber ribbons, the intermittent bonding is accomplished by inkjet printing of adhesive at predetermine intervals or patterns. However, inkjet printing may have limitations associated with the speed of the optical fibers moving under print heads. Further, inkjet printing may be sensitive to adjustment of the speed causing variations in the bond regions interval or pattern, which may in turn effect one or more characteristics of the optical fiber ribbon, such as flexibility or reliability. Another example intermittent bonding process includes coating and curing of an adhesive between adjacent optical fibers and then utilizing a cutting tool to selectively cut or slice the adhesive, such that adjacent optical fibers are bonded only at predetermined locations. However, the cutting tool method may have several drawbacks. For example, the cutting tool may cause damage to one or more of the optical fibers, if the cutting tool contacts the optical fibers. The speed of the optical fibers may be limited to enable accurate cutting of the adhesive. Additionally, the cutting tool may need to be cleaned or sharpened regularly, causing fabrication interruptions that may reduce output. In an example embodiment of the method disclosed herein, an adhesive may be applied to the adjacent optical fibers, and then be exposed to a curing catalyst at one or more predetermined locations to create bonded regions. The uncured adhesive is then removed, such as by a high pressure air source. The disclosed intermittent bonding method may be faster than the inkjet method or cutting tool method discussed above. The disclosed intermittent bonding method may be significantly less sensitive to adjustments in the speed of the optical fibers undergoing the curing process. Further, the disclosed intermittent bonding method may not expose the optical fibers to potential damage by physical contact with a cutting tool.

In some example embodiments, the bonding regions allow for incorporation of identifying characteristics through the deposition of at a colored material on the bonding regions. For example, a material may be a color layer to provide identification of the ribbon. Each of these exemplary embodiments will be described in greater detail below, and these exemplary embodiments are provided by way of illustration, and not by way of limitation. These and other aspects and advantages will be discussed in relation to the embodiments provided herein.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from four to thirty-six. Additionally, in embodiments, the optical fibers 12 may include an outer ink layer, which may further allow for arrangement of the optical fibers 12 in a color-coded pattern. For example, one convention for color-coding the optical fibers 12 is to arrange them in the following color sequence: blue, orange, green, brown, slate, white, red, black, yellow, violet, rose, and aqua. In embodiments containing more than twelve optical fibers 12, the pattern of colors may be repeated. The optical fibers 12 are color-coded in this way to help organize and identify specific optical fibers 12 when making connections or splices.

In embodiments, the optical fiber ribbon 10 has a first configuration in which the optical fibers 12 are arranged in a substantially planar row, which helps to organize the optical fibers 12 for mass fusion splicing. Further, as will be described more fully below, the optical fibers 12 also can be rolled, curled, or folded into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the optical fibers 12 are only held together intermittently along the length of the optical fiber 12 by a plurality of intermittent bonding regions 14.

In a conventional optical fiber ribbon, the optical fibers are bonded to each other along their entire length to hold them in the planar configuration. According to the present disclosure, however, the optical fibers 12 are bonded intermittently along the length of the optical fiber ribbon 10 so that the optical fibers 12 are not rigidly held in the planar configuration. In between the intermittent bonding regions 14, the optical fibers 12 are not bonded to each other along their length. In this way, the present optical fiber ribbon 10 provides the advantages of a ribbon with respect to fiber organization and mass fusion splicing while also allowing for a more compact cable design.

FIG. 1 depicts the intermittent bonding regions 14 arranged widthwise across all the optical fibers 12. In embodiments, the bonding regions 14 may be provided on one or both sides of the optical fiber ribbon 10. For example, the bonding regions 14 may be on both sides of the optical fiber ribbon 10 at a particular location along the length, or for example, the bonding regions 14 may alternate sides (e.g., one or more bonding regions 14 on one side of the optical fiber ribbon 10 followed by one or more bonding regions 14 on the opposite side of the optical fiber ribbon 10). Still further, in an example, all of the bonding regions 14 are provided on the same side of the optical fiber ribbon 10.

Additionally, in embodiments, the bonding regions 14 can be continuous or discontinuous across the width of the optical fiber ribbon 10. For example, in embodiments, each bonding region 14 is comprised of one or more bonds holding adjacent optical fibers 12 together with the bonds being contiguous with each other, or in other embodiments, each bonding region 14 is comprised of one or more bonds holding adjacent optical fibers 12 together without the bonds being contiguous with each other.

In other embodiments, the intermittent bonding regions 14 may be staggered across subsets of the optical fibers 12 in the optical fiber ribbon 10. For example, within an intermittent bonding region 14, as few as two of the optical fibers 12 may be bonded together at a particular location along the length of the optical fiber ribbon 10. Notwithstanding the number and location of bonds across the width, the layer of material containing a colorant (described below) may extend across the entire width of the optical fiber ribbon in the bonding region 14 for identification purposes.

Figure 2:
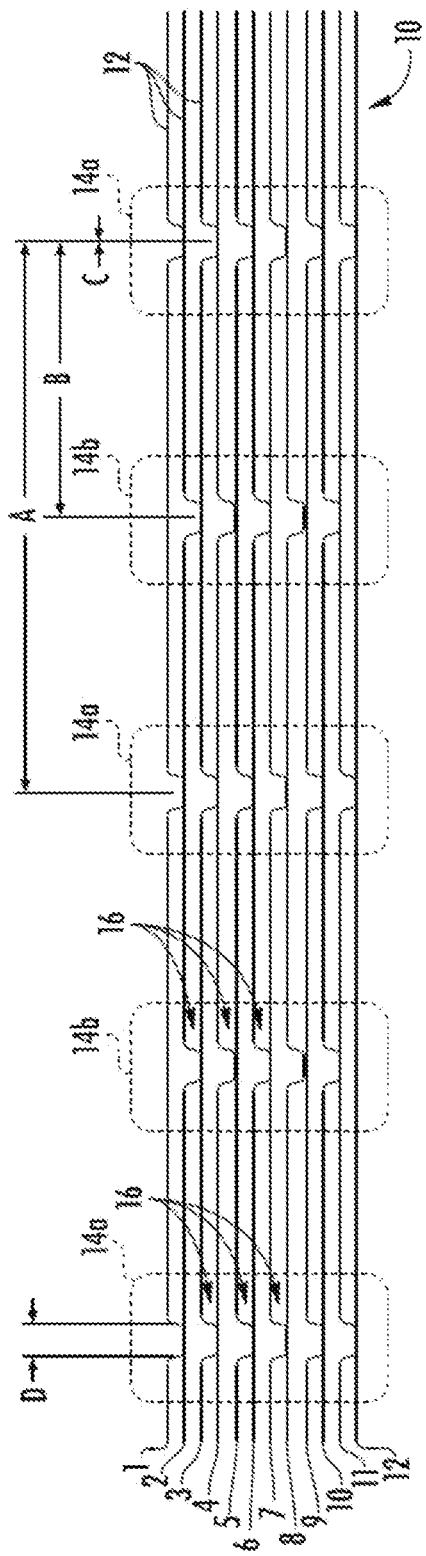
FIG. 2 depicts an exemplary pattern for bonding regions of the optical fiber ribbon, according to an exemplary embodiment.
Figure 3:
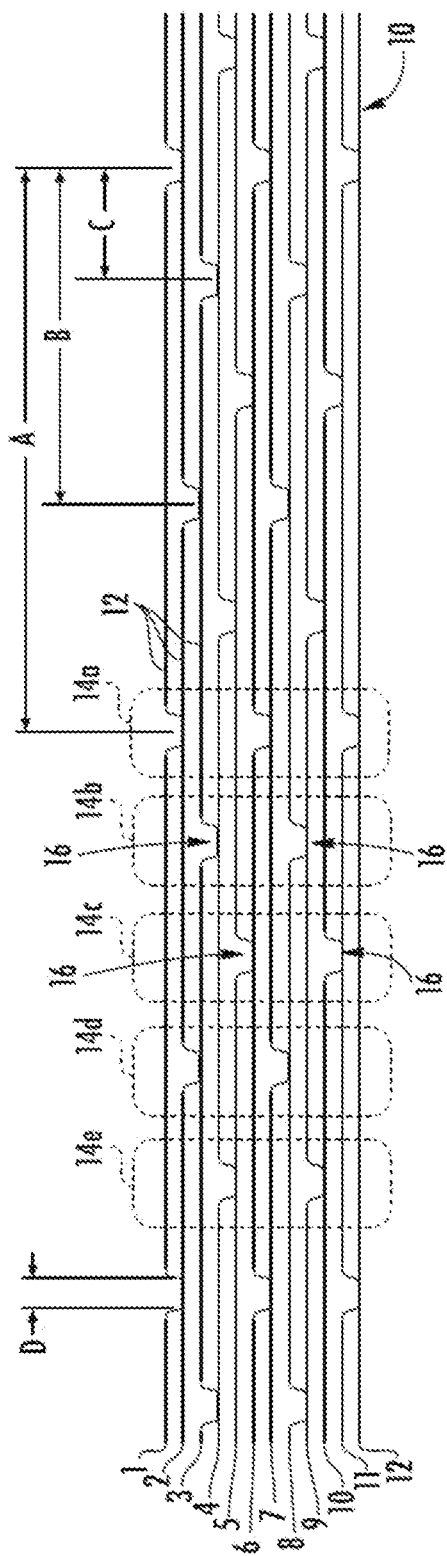
FIG. 3 depicts another exemplary pattern for bonding regions of the optical fiber ribbon, according to an exemplary embodiment.

FIGS. 2 and 3 provide example bonding patterns for bonds 16 between optical fibers 12 of the intermittent bonding regions 14. For the purposes of describing the bonding patterns in FIGS. 2 and 3, the optical fibers are numbered 1-12 going from top to bottom with respect to the orientation of those figures. For additional reference, the bonds between optical fibers are referred to as odd or even. In the embodiments depicted in which there are twelve optical fibers, there are eleven bonds between the optical fibers, and thus, the odd bonds are the first (between optical fibers 1-2), third (3-4), fifth (5-6), seventh (7-8), ninth (9-10), and eleventh (11-12). The even bonds are the second (2-3), fourth, (4-5), sixth (6-7), eighth (8-9), and tenth (10-11). The number of bonds varies based on the number of optical fibers. In particular, the number of bonds between optical fibers is one less than the number of optical fibers.

FIG. 2 depicts an embodiment of a bonding pattern in which the bonds 16 of each bonding region 14 are provided in an alternating pattern of bonding regions 14a, 14b. In the first bonding region 14a, the following odd pairs of optical fibers 12 are bonded to each other: 1-2, 3-4, 5-6, 7-8, 9-10, and 11-12. In the second bonding region 14b, the even pairs of optical fibers 12 are bonded to each other: 2-3, 4-5, 6-7, 8-9, and 10-11.

FIG. 3 depicts an embodiment in which the bonds 16 of each bonding region 14 are staggered along the length of the optical fibers 12. The bonds 16 between optical fibers 12 are provided in a repeating pattern. In a first bonding region 14a, the following optical fibers 12 are bonded to each other: 1-2, 6-7, and 11-12. In a second bonding region 14b, the following optical fibers 12 are bonded to each other: 3-4 and 8-9. In a third bonding region 14c, the following optical fibers 12 are bonded to each other: 5-6 and 10-11. In a fourth bonding region 14d, the following optical fibers 12 are bonded to each other: 2-3 and 7-8. In a fifth bonding region 14e, the following optical fibers 12 are bonded to each other: 4-5 and 9-10. The pattern of bonding regions 14 is repeated 14a, 14b, 14c, 14d, 14e along the length of the optical fiber ribbon 10. Within one period of the repeating pattern, each optical fiber 12 is bonded to its one (in the case of edge fibers) or two adjacent optical fibers 12.

FIGS. 2 and 3 represent intermittent bonds 16 made between optical fibers 12. The bonds 16 are provided in repeating patterns of bonding regions 14. FIG. 2 depicts alternating bonding regions 14a, 14b, and FIG. 3 depicts a pattern of five repeating bonding regions 14a-14e. In embodiments, the bonding regions may have as few as one bond 16 between two optical fibers 12 or as many bonds 16 as the number of optical fibers 12 divided by two (e.g., up to six bonds in a bonding region 14 for twelve optical fibers 12, such as shown in bonding region 14a of FIG. 2). In other embodiments, the bonding regions may have as many bonds as necessary to join each optical fiber 12 to its adjacent optical fiber or fibers 12 at the same longitudinal location (e.g., eleven bonds 16 to join twelve optical fibers 12).

As can be seen in FIGS. 2 and 3, the spacing between bonding regions 14 is denoted by intervals A, B, and C. Interval A is the spacing between repeating elements, such as the spacing between a bonding region 14a and the next bonding region 14a. In embodiments, interval A is from 20 mm to 100 mm. Interval B is the spacing between adjacent even and odd bonds, such as the distance between the bond 1-2 and bond 2-3. In FIG. 2, interval B is the midpoint of interval A, i.e., B=0.5A, which is 10 mm to 50 mm in embodiments, because the even and odd bonds are alternated. In FIG. 3, interval B is the midpoint as shifted by interval C, which is the distance between even bonds or odd bonds (e.g., distance between bond 1-2 and bond 3-4 or between bond 2-3 and bond 4-5). In embodiments, interval C is from 0 mm to 20 mm. In FIG. 2, interval C is 0 mm because all the odd bonds are in the same bonding region 14a and all the even bonds are in the same bonding region 14b. Thus, in the bonding pattern of FIG. 2, interval B is at the midpoint of interval A (B=0.5A). In FIG. 3, interval C is not 0 mm, and the bonding pattern is created by shifting each successive odd or even bond by interval C. Thus, the odd and even bonds form a stepped pattern across the bonding regions 14a-14e. In this way, interval B becomes shifted from the midpoint of interval A by interval C (B=0.5A+C). In embodiments, interval B is from 0.5A to 0.75A when taking into account shifting by interval C.

FIGS. 2 and 3 also depict a dimension D, which is the length of each bond 16. In embodiments, the length D is from 1 mm to 10 mm. Embodiments of the bonds 16 will be described in greater detail in relation to FIGS. 4 and 5, below.

Figure 4:
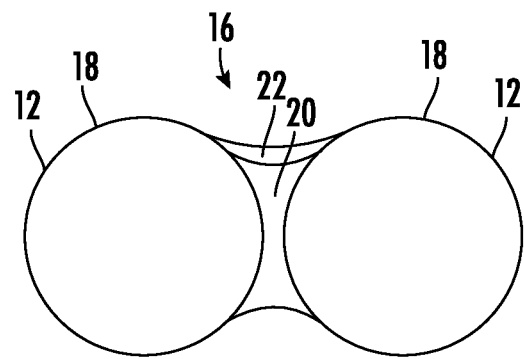
FIG. 4 depicts a longitudinal cross-sectional view of a bond between two optical fibers of the optical fiber ribbon, according to an exemplary embodiment.

FIG. 4 depicts a longitudinal cross-section of a bond 16 between two optical fibers 12. As can be seen in FIG. 4, the optical fibers 12 have outer surfaces 18 that are in close proximity or are touching each other. The bond 16 joining the two optical fibers 12 is comprised of an adhesive 20. In the embodiment of FIG. 4, adhesive 20 is deposited on and is in contact with the outer surfaces 18 of the optical fibers 12. The adhesive 20 is configured to bond the optical fibers 12 to each other, whereas the second material 22 is deposited for color-coding of the optical fiber ribbon 10 among a plurality of optical fiber ribbons in an optical fiber cable. In an embodiment, the adhesive 20 for bonding the optical fibers 12 together is a curable formulation, such as a photo curing adhesive, for example a UV-curable adhesive formulation) comprising one or more urethane acrylate oligomers, one or more acrylate monomers, one or more photoinitiators, an antioxidant, and other typical processing additives. In embodiments, the adhesive 20 has a Young's modulus of from 1 MPa to 50 MPa, an elongation at break greater than 200%, and/or a viscosity lower than 8000 cP at 25° C. Further, in embodiments, the adhesive 20 has a glass transition temperature of from −40° C. to 50° C.

In some example embodiment a second material 22 is deposited on the adhesive 20. In an example embodiments, the second material 22 may also be in contact with the outer surfaces 18 of the optical fibers 12. The second material 22 may be configured as a color layer to enable identification of the Optical fiber ribbon 10. The second material is a curable formulation (e.g., UV-curable formulation) comprising one or more urethane acrylate oligomers, one or more acrylate monomers, one or more photoinitiators, an antioxidant, and other typical processing additives. In embodiments, the second material 22 has a Young's modulus of from 100 MPa to 1500 MPa, an elongation at break of from 20% to 200%, and/or a viscosity lower than 30000 cP at 25° C. Further, in embodiments, the second material 22 has a glass transition temperature of from 0° C. to 100° C.

In some example embodiments, the adhesive 20 and/or the second material 22 may be selected to have additional functionality or properties. For example, the second material 22 as the outer material may be selected to have a low coefficient of friction to allow for the optical fiber ribbons 10 to slide past each other more easily. Further, the adhesive 20 may be selected to be substantially clear (e.g., transmit at least 70%, at least 80%, or at least 90% of light having a wavelength in the range of 400 nm to 800 nm), whereas the second material 22 is selected to contain a colorant, such as a dye, an ink, or a pigment. In this way, the second material can provide color identification of the optical fiber ribbon 10.

Figure 5:
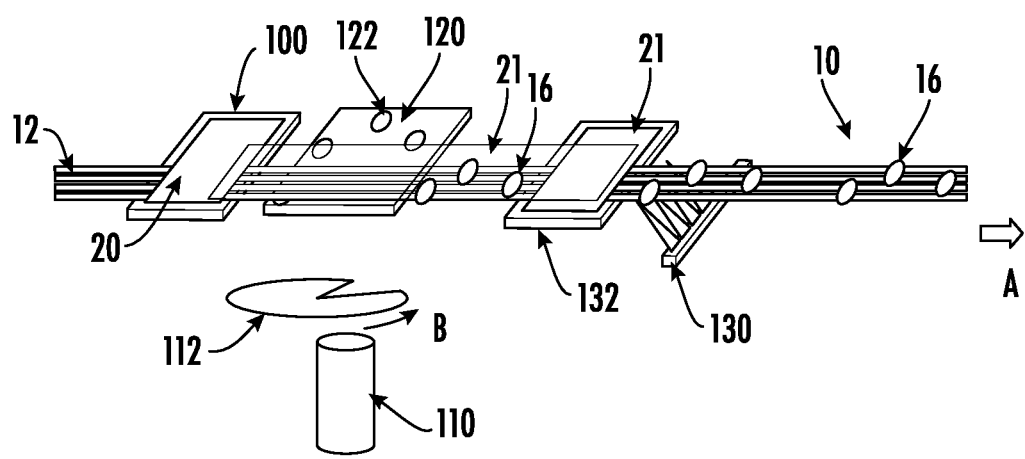
FIG. 5 depicts a schematic representation of the method of fabricating the optical fiber ribbon, according to an exemplary embodiment.

FIG. 5 depicts a schematic representation of the method of fabricating the optical fiber ribbon 10. A plurality of optical fibers 12 may be arranged adjacent to each other along a length of the optical fiber ribbon 10. The optical fibers 12 may be disposed in contact or in very close proximity to each other, as discussed above in reference to FIG. 4. The optical fibers may be feed through one or more processing steps illustrated by arrow A and described below.

As the optical fibers progress through the process, the adhesive 20 may be applied to the optical fibers 12. The adhesive 20 may be applied by spray, such as an aerosol mist, or may be applied mechanically, by brush or roller. In some example embodiments, the adhesive 20 may be applied by passing the optical fibers through an adhesive bath 100. The optical fibers 12 may enter the adhesive bath 100 and pass under the surface of the adhesive, such as passing under a submergence bar, and then pass out of the adhesive bath 100. The adhesive 20 may wet the periphery of the optical fibers 12, such that adhesive 20 is disposed between each of the adjacent optical fibers 12.

The method continues with intermittently exposing the adhesive 20 to a curing catalyst in at least one interstice between two adjacent optical fibers 12 to create bonds 16 along the length of the optical fiber ribbon 10. The curing catalyst may be heat, light, or other suitable catalyst. In an example embodiment, the adhesive 20 is a photo curing adhesive and the curing catalyst is a light source 110. The light source may be selected to have sufficient lumens to cure the adhesive 20 in a predetermined exposure interval, e.g. as the optical fibers 12 pass the light source 110. In some example embodiments, the adhesive 20 is a UV curable adhesive, as discussed above, and the light source 110 is a UV light source.

In an example embodiment, intermittent exposure of the adhesive 20 to the light source 110 or heat source, may be accomplished by intermittent energization and de-energization of the light source or heat source. Additionally or alternatively, the light or heat form the light source 110 or heat source, respectively, may be blocked from exposing at least a portion of the optical fibers 12. For example, a shutter 112 may be disposed between the light source 110 and the plurality of optical fibers 12. Rotation of the shutter 112, as depicted by Arrow B, may allow light to pass to the optical fibers 12 at a predetermined interval. The predetermined interval may be defined by the speed of rotation of the shutter 112 and/or the width of an aperture in the shutter 112. Further, in some example embodiments, the rotation of the shutter 112 may be synchronized with the travel speed of the optical fibers 12 relative to the light source 110. For example, the rotation of the shutter 112 may enable sufficient light to pass to the optical fibers 12 to cure the adhesive 20 at the travel speed of the optical fibers 12.

In some example embodiments, a mask 120 is provided between the curing catalyst, e.g. light source 110, and the optical fibers 12. The mask 120 may block at least a portion of the light, such that the optical fibers are only exposed to the curing catalyst at predetermine areas defined by the mask 120. For example, the mask 120 may include a plurality of apertures 122 defining the predetermine areas. In an example embodiments, the predefined areas and/or the intermittent exposure of the light source 110 may define the bonds 16 and/or the pattern of the bonding regions, such as the examples discussed above in reference to FIGS. 2 and 3.

Next, the method may continue with removing uncured adhesive 21 from the optical fibers 12. The optical fibers 12 may travel toward a high pressure air source 130. The high pressure air source may push the uncured adhesive backward, away from the direction of travel. The uncured adhesive 21 may collect at a barrier point due to adhesion, until overcome by gravity and falling off of the optical fibers 12. Additionally or alternatively, the uncured adhesive 21 may be blown off of the optical fibers 12 by the high pressure air source 130. The uncured adhesive 21 may be collected by a reservoir 132 positioned under the optical fibers 12. In some example embodiments, the uncured adhesive 21 may be recycled to the adhesive bath 100 to minimize waste of the adhesive 20.

The high pressure air source 130 may be an air nozzle, such as a pneumatic cleaner, "air gun," or "air knife" configured to provide sufficient air pressure to drive the adhesive off of the optical fibers 12, but low enough to not damage or deform the optical fiber ribbon 10 and or the bonds 16. The high pressure air source 130 may be any suitable air nozzle, and may include, as a non-limiting example, Model 5920 Air Gun with flat nozzle offered by Silvent (Portage, IN).

As discussed above, a second material 22 may be applied to one or more of the bonds 16 enabling identification of the optical fiber ribbon 10. In the case where the second material 22 provides color identification, a plurality of dots of the second material 22 may be inkjet printed on the bonds 16. The dots may be substantially circular and have a diameter of from 50 μm to 350 μm. In an example embodiment, the second material 22 is applied over bonds 16 after the adhesive 20 has fully dried or cured. In other embodiments, the second material is applied over the bonds 16 before the adhesive 20 has fully dried or cured, such that the adhesive 20 and second material 22 intermix at the interface between the adhesive 20 and the second material 22, which provides good adhesion therebetween.

The color of the second material 22 can vary among the bonding regions 14. For example, FIG. 1 shows three bonding regions 14 over a span of an optical fiber ribbon 10. The bonding regions 14 are patterned in embodiments in order to identify the group of ribbons to which a particular optical fiber ribbon 10 belongs as well as identifying the specific ribbon 10 within the group. For example, an optical fiber cable containing 864 optical fibers may contain six groups of ribbons with each group having 144 fibers. The 144 fibers may be arranged as twelve ribbons 10, each having twelve optical fibers 12 (that is, [twelve optical fibers in a ribbon]×[twelve ribbons in a group]×[six groups in a cable]=864 optical fibers). Using the intermittent bonding regions 14, the colors of two consecutive bonding regions 14 can be used to identify ribbon group, and the color of the following bonding region 14 can be used to identify the specific ribbon of the group.

Figure 6:
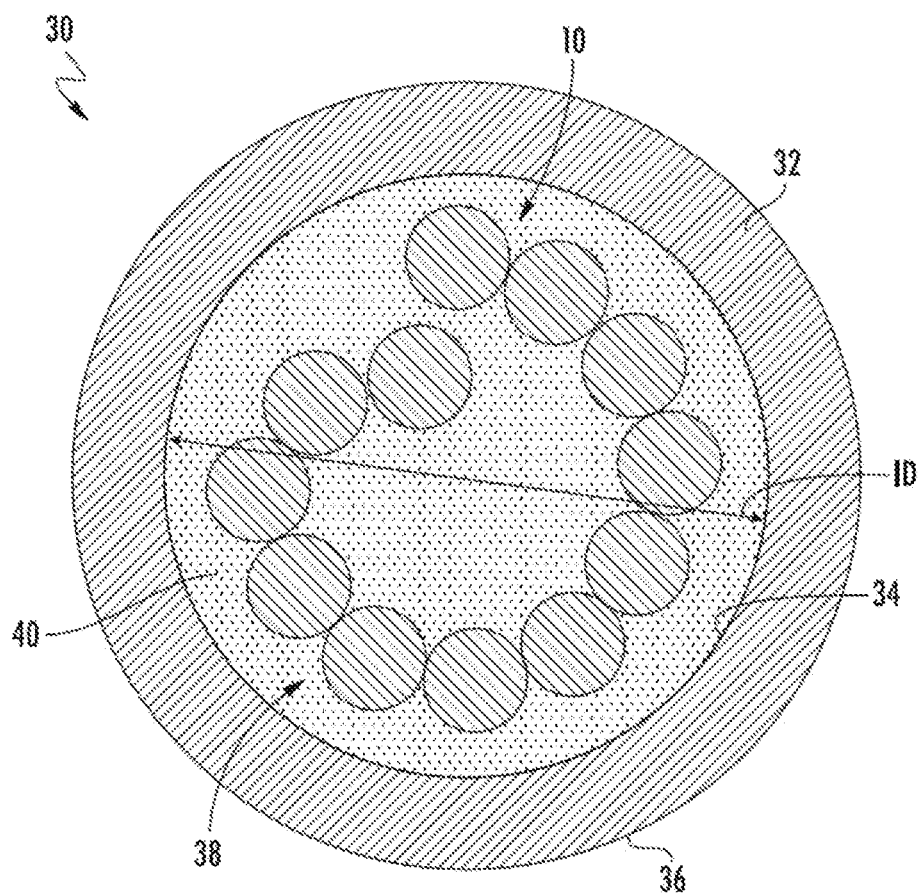
FIG. 6 depicts a longitudinal cross-section of an optical fiber cable including an intermittently bonded optical fiber ribbon, according to an exemplary embodiment.

As mentioned above, the intermittently bonded optical fiber ribbon 10 allows for smaller cable diameters and/or higher fill ratios. FIG. 6 depicts an exemplary embodiment of an optical fiber cable 30 containing an intermittently bonded optical fiber ribbon 10. The optical fiber cable 30 has a cable jacket 32 with an inner surface 34 and an outer surface 36. In embodiments, the outer surface 36 is the outermost surface of the optical fiber cable 30. The inner surface 34 defines a central bore 38 containing the optical fiber ribbon 10. The central bore 38 has a diameter, which is the inner diameter ID of the cable jacket 32. As shown in FIG. 6, the central bore 38 is also filled with filling material 40, which may be, e.g., strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fill ratios are achievable by reducing the maximum cross-sectional dimension of the optical fiber ribbon 10. In particular, by rolling or curling the optical fiber ribbon 10 into, e.g., a circle or spiral, the inner diameter ID of the cable 30 can be smaller, providing an overall smaller and more highly filled cable design. Notwithstanding, the optical fiber ribbon 10 can still be removed from the optical fiber cable 30, flattened into the planar configuration, and then easily be mass fusion spliced like a conventional optical fiber ribbon. For the sake of simplicity, a single optical fiber ribbon 10 was shown in the optical fiber cable 30. However, in other embodiments, the optical fiber cable 30 may contain several tens or hundreds of optical fiber ribbons 10. Further, such optical fiber ribbons 10 may be arranged in one or more buffer tubes within the central bore 38 of the cable jacket 32.

In an example embodiment, a method of fabricating an optical fiber ribbon is provided. The method including arranging a plurality of optical fibers adjacent to each other along a length of the optical fiber ribbon, applying an adhesive to the plurality of optical fibers, intermittently exposing the adhesive to a curing catalyst in at least one interstice between two adjacent optical fibers of the plurality of optical fibers to create bonding regions along the length of the optical fiber ribbon, and removing uncured adhesive from the plurality of optical fibers.

In some example embodiment, the adhesive is a photo curable adhesive, and the curing catalyst is a light source. In an example embodiment, the adhesive is an ultraviolet (UV) curable adhesive and the light source is UV light source. In some example embodiment, intermittently exposing the adhesive to the curing catalyst includes intermittently energizing and deenergizing the light source. In an example embodiment, intermittently exposing the adhesive to the curing catalyst includes intermittently blocking the light source from exposing at least a portion of the plurality of optical fibers. In some example embodiment, intermittently blocking the light source includes rotation of a shutter disposed between the light source and the plurality of optical fibers. In an example embodiment, the rotation of the shutter is synchronized with a travel speed of the plurality of optical fibers relative to the light source. In some example embodiment, the method also includes providing a mask between the curing catalyst and the plurality of optical fibers, such that the plurality of optical fibers is only exposed to the curing catalyst at predetermine areas defined by the mask. In an example embodiment, removing the uncured adhesive includes directing a high pressure air source toward the plurality of optical fibers. In some example embodiment, the high pressure air source includes one or more pneumatic air cleaners. In an example embodiment, the method also includes collecting the uncured adhesive. In some example embodiment, the method of also includes applying a material to one or more of the bonding regions, wherein the material includes a colorant configured to identify the optical fiber ribbon. In an example embodiment, the material comprises a plurality of inkjet printed dots having a thickness of from 5 μm to 100 μm. In some example embodiment, applying the material to one or more of the bonding regions includes inkjet printing the material onto one or more of the bonding regions.

In another example embodiment, a method of fabricating an optical fiber ribbon is provided. The method including arranging a plurality of optical fibers adjacent to each other along a length of the optical fiber ribbon, passing the plurality of optical fibers through an adhesive, such that the adhesive coats the plurality of optical fibers, providing a mask between a curing light source and the plurality of optical fibers, such that the plurality of optical fibers is exposed to the curing light source at predetermine areas defined by the mask, intermittently exposing the adhesive to the curing light source in at least one interstice between two adjacent optical fibers of the plurality of optical fibers to create bonding regions along the length of the optical fiber ribbon; and removing uncured adhesive from the plurality of optical fibers by passing the plurality of optical fibers through a high pressure air source.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of manufacturing an optical fiber ribbon, the method comprising:
    arranging a plurality of optical fibers adjacent to each other along a length of the optical fiber ribbon;
    applying an adhesive to the plurality of optical fibers;
    intermittently exposing the adhesive to light in at least one interstice between two adjacent optical fibers of the plurality of optical fibers to create bonding regions along the length of the optical fiber ribbon, the light emitted by a light source and configured to at least partially cure the adhesive, wherein intermittently exposing the adhesive to the light comprises at least one of:
        intermittently energizing and deenergizing the light source;
        providing, between the light source and the adhesive applied to the plurality of optical fibers, a mask having at least one aperture formed therein, wherein the plurality of optical fibers are passed by the mask such that the plurality of optical fibers is exposed to the light at predetermined areas defined by the mask, or
        providing a shutter between the light source and the adhesive applied to the plurality of optical fibers, wherein the shutter intermittently allows light to pass from the light source to the adhesive applied to the plurality of optical fibers; and
    removing uncured adhesive from the plurality of optical fibers.

2. The method of claim 1, wherein the adhesive comprises an ultraviolet (UV) curable adhesive and the light source is a UV light source.

3. The method of claim 1, wherein intermittently exposing the adhesive to the light comprises intermittently energizing and deenergizing the light source.

4. The method of claim 1, wherein intermittently exposing the adhesive to the light comprises providing the shutter between the light source and the adhesive applied to the plurality of optical fibers.

5. The method of claim 4, wherein the shutter is a rotating shutter, wherein intermittently exposing the adhesive to the light comprises rotation of the shutter disposed between the light source and the plurality of optical fibers.

6. The method of claim 5, wherein the rotation of the shutter is synchronized with a travel speed of the plurality of optical fibers relative to the light source.

7. The method of claim 1, wherein intermittently exposing the adhesive to the light comprises:
    providing the mask having the plurality of apertures formed therein between the light source and the adhesive applied to the plurality of optical fibers, such that the plurality of optical fibers is exposed to the light at predetermined areas defined by the mask.

8. The method of claim 1, wherein removing the uncured adhesive comprises directing a high pressure air source toward the plurality of optical fibers.

9. The method of claim 8, wherein the high pressure air source comprises one or more pneumatic air cleaners.

10. The method of claim 8 further comprising:
    collecting the uncured adhesive.

11. The method of claim 1 further comprising:
applying a material to one or more of the bonding regions, wherein the material comprises a colorant configured to identify the optical fiber ribbon.

12. The method of claim 11, wherein the material comprises a plurality of inkjet printed dots having a thickness of from 5 µm to 100 µm.

13. The method of claim 11, wherein applying the material to one or more of the bonding regions comprises inkjet printing the material onto one or more of the bonding regions.

14. An optical fiber ribbon manufactured according to the method of claim 1.

15. A method of manufacturing an optical fiber ribbon, the method comprising:
arranging a plurality of optical fibers adjacent to each other along a length of the optical fiber ribbon;
passing the plurality of optical fibers through an adhesive, such that the adhesive coats the plurality of optical fibers;
providing a mask between a curing light source and the plurality of optical fibers, the mask having at least one aperture formed therein, wherein the plurality of optical fibers travel past the mask such that the plurality of optical fibers is exposed to the curing light source at predetermined areas defined by the mask,
intermittently exposing the adhesive to the curing light source in at least one interstice between two adjacent optical fibers of the plurality of optical fibers to create bonding regions along the length of the optical fiber ribbon; and
removing uncured adhesive from the plurality of optical fibers by passing the plurality of optical fibers through a high pressure air source.

16. The method of claim 15, wherein the adhesive comprises an ultraviolet (UV) curable adhesive and the curing light source is a UV light source.

17. The method of claim 15 further comprising:
applying a material to one or more of the bonding regions, wherein the material comprises a colorant configured to identify the optical fiber ribbon.

18. The method of claim 17, wherein applying the material to one or more of the bonding regions comprises inkjet printing the material onto one or more of the bonding regions.

19. The method of claim 15, wherein intermittently blocking the curing light source comprises providing a shutter disposed between the curing light source and the mask, wherein the shutter intermittently allows light to pass from the curing light source and through the mask.

20. The method of claim 19, wherein the shutter is synchronized with a travel speed of the plurality of optical fibers relative to the curing light source.

* * * * *